United States Patent [19]
deMey, II

[11] Patent Number: 4,750,405
[45] Date of Patent: Jun. 14, 1988

[54] VIBRATION AND SHOCK ISOLATION APPARATUS

[75] Inventor: Charles F. deMey, II, West Redding, Conn.

[73] Assignee: The Perkin-Elmer Corporation, Norwalk, Conn.

[21] Appl. No.: 702,987

[22] Filed: Feb. 19, 1985

Related U.S. Application Data

[63] Continuation-in-part of Ser. No. 527,883, Aug. 30, 1983, abandoned.

[51] Int. Cl.4 .................................... F01B 25/04
[52] U.S. Cl. ............................ 91/171; 91/457; 91/512; 91/524; 248/636; 269/20; 269/310
[58] Field of Search .......... 91/454, 457, 524, 530, 91/512, 171; 269/20, 310; 248/562, 636

[56] References Cited

U.S. PATENT DOCUMENTS

| | | | |
|---|---|---|---|
| 1,962,924 | 6/1934 | Bristol | 91/171 |
| 2,479,089 | 8/1949 | Voskamp | 91/171 |
| 2,978,256 | 4/1961 | Bertsch | 91/390 |
| 3,039,513 | 6/1962 | Lasiewicz | 91/171 |
| 3,107,695 | 10/1963 | Broadwell | 91/457 |
| 3,306,170 | 2/1967 | Kreuter | 91/457 |
| 3,392,632 | 7/1968 | Volkmann | 91/457 |
| 3,589,242 | 6/1971 | Peterson | 91/524 |
| 3,638,535 | 2/1972 | Ponter | 91/171 |
| 3,730,473 | 5/1973 | Pepi | 137/627.5 |
| 3,784,146 | 1/1974 | Matthews | 248/562 |
| 3,814,356 | 6/1974 | Coleman | 248/636 |
| 3,896,704 | 7/1975 | Barud | 91/524 |
| 4,109,678 | 8/1978 | Chapman | 91/457 |
| 4,157,066 | 6/1979 | Pretty | 91/171 |
| 4,336,917 | 6/1982 | Phillips | 248/550 |
| 4,373,334 | 2/1983 | Carlander | 92/33 |

FOREIGN PATENT DOCUMENTS

| | | | |
|---|---|---|---|
| 0027195 | 4/1981 | European Pat. Off. | |
| 6932060 | 8/1969 | Fed. Rep. of Germany | |
| 1143363 | 2/1969 | United Kingdom | 91/171 |
| 0628351 | 10/1978 | U.S.S.R. | 91/171 |

OTHER PUBLICATIONS

F&M Feinwerktechnik & Messtechnik, vol. 88, No. 5, Jul./Aug. 1980, pp. 233-236, Munchen: H. De Boer et al.: "Einschwingungsisolierter Messtisch mit Niverau-Regelung", * paragraphs 1, 2, 3.1, 3.3-3.5 *.

*Primary Examiner*—Abraham Hershkovitz
*Attorney, Agent, or Firm*—Ronald G. Cummings; Edwin T. Grimes; Francis L. Masselle

[57] ABSTRACT

In a sensitive analytical instrument having an optical bench carried by a base member, new and improved vibration and shock isolation apparatus which includes three spaced pneumatic mounts interposed between the optical bench and the base member to provide vibration and shock isolation therebetween, each of the mounts having a preselected optimum linear range of operation, a source of pressurized gas, apparatus for individually controlling the inflation and deflation of each of the mounts with pressurized gas to maintain actual operation of each of the mounts within its preselected optimum linear operating range.

6 Claims, 1 Drawing Sheet

VIBRATION AND SHOCK ISOLATION APPARATUS

This application is a continuation-in-part of my copending application Ser. No. 527,883 filed on August 30, 1983, now abandoned.

FIELD OF INVENTION

This application relates to vibration isolation apparatus, which is particularly adopted for use with very delicate, sensitive analytical instruments.

BACKGROUND OF THE INVENTION

A most critical portion, with respect to mechanical stability, of an analytical instrument such as, for example, a spectroscopic instrument, is the optical components. The mounting of such components is of considerable importance. That is, the mounting of the optical bench should be capable of withstanding mechanical shocks and vibrations for the instrument to operate with appropriate sensitivity, accuracy and repeatability.

Ordinarily, the optical bench is mounted on a rigid frame by means of a plurality of conventional mechanical shock mounts. However, such mechanical shock mounts are often insufficient to provide the required degree of shock and vibration isolation.

As an alternative to the more conventional mechanical shock mounts, there are commercially available pneumatic spring mounts. However, such mounts have a number of problems. For example, initially inflating the mounts to the proper level is difficult, partially because the internal volume thereof is small. Further, it can be quite maddening to try to level a surface when four or more mounts are employed because the slightest adjustment to any single one inherently affects all the others. Additionally, the maintaining of the proper level over a period of time requires constant inspection and corrective action.

SUMMARY OF THE INVENTION

Accordingly, it is one object of the present invention to provide new and improved vibration and shock isolation apparatus for use with very delicate and sensitive analytical instruments, which overcomes or at least partially obviates the aforesaid problems of the prior art.

Applicant has found that pneumatic spring mounts provide excellent shock and vibration isolation if they are constrained to operate at their optimum linear position. That is, such pneumatic spring mounts must be constrained to operate within their optimum, limited, linear range. Briefly, the present invention is directed to vibration and shock isolation apparatus for use with sensitive analytical instruments having an optical bench carried by a base member, said apparatus including three spaced pneumatic mounts interposed between the optical bench and the base member to provide vibration and shock isolation therebetween. Each of the mounts has a preselected optimum linear range of operation. A source of pressurized gas is provided as well as means for individually controlling the inflation and deflation of each of the mounts with the pressurized gas to maintain actual operation of each of the mounts within its preselected optimum linear operating range.

According to one aspect of the invention, the means for individually controlling the inflation and deflation of each of the mounts includes a first valve for controlling the flow of the gas to the mount for controlling the inflation of said mount, a second valve for controlling the flow of gas from the mount for controlling the deflation thereof, each of the valves having an actuating button. In addition, there is provided a valve actuating bar engageable with the buttons so that linear movement of the bar in one direction sequentially closes one valve and then opens the other valve and in the opposite direction it sequentially closes said other valve and opens said one valve. Further, there is provided trigger means for linearly moving the valve actuating bar responsive to movement of the optical bench with respect to the base member.

According to still another aspect of the invention, there is provided spring stop means interposed between the trigger finger and the actuating bar lever to allow overtravel of the trigger finger when the pneumatic mounts are void of air.

There has thus been outlined rather broadly the more important features of the invention in order that the detailed description thereof that follows may be better understood, and in order that the present contribution to the art may be better appreciated. There are, of course, additional features of the invention which will be described more fully hereinafter. Those skilled in the art will appreciate that the conception on which this disclosure is based may be readily utilized as the basis for the designing of other apparatus for carrying out the several purposes of the invention. It is important, therefore, that this disclosure be regarded as including such equivalent apparatus as do not depart from the spirit and scope of the invention.

One embodiment of the invention has been chosen for purposes of illustration and description, and is shown in the accompanying drawings, forming a part of the application.

DETAILED DESCRIPTION OF A PRESENTLY PERFERRED EMBODIMENT OF THE INVENTION

Figure 3:
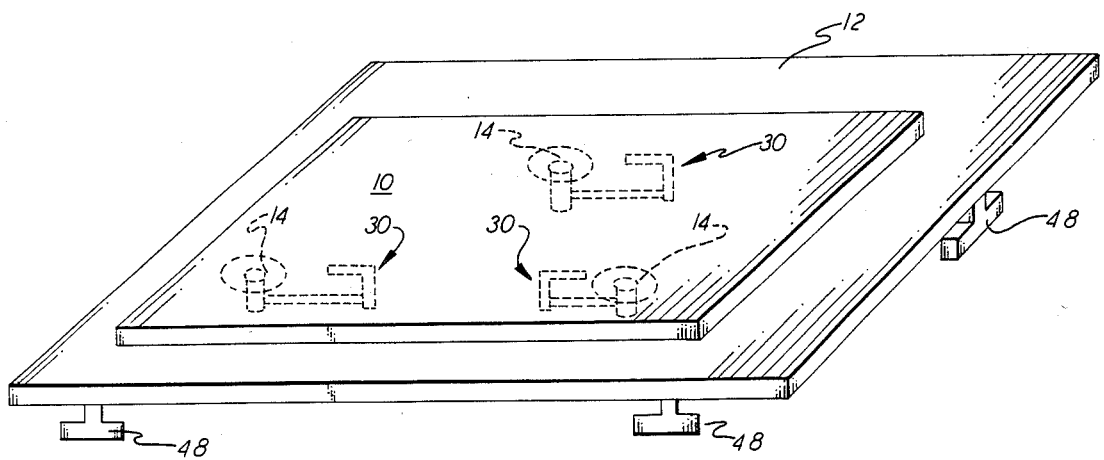
FIG. 3 is a perspective view showing the optical bench mounted on three space pneumatic mounts.

Referring initially to FIG. 3, an optical bench 10 is shown carried by a base member 12, by means of three pneumatic spring mounts 14. Any suitable type of pneumatic spring mounts may be employed such as, for example, type SLM-1 manufactured and sold by the Barry Corporation of Watertown, Mass. These mounts may be referred to as STABL-LEVL, which is a registered trademark of the Barry Corporation. Thus, the pneumatic spring mounts 14 are interposed between the optical bench 10 and the base member 12 to provide vibration and shock isolation therebetween.

Figure 1:
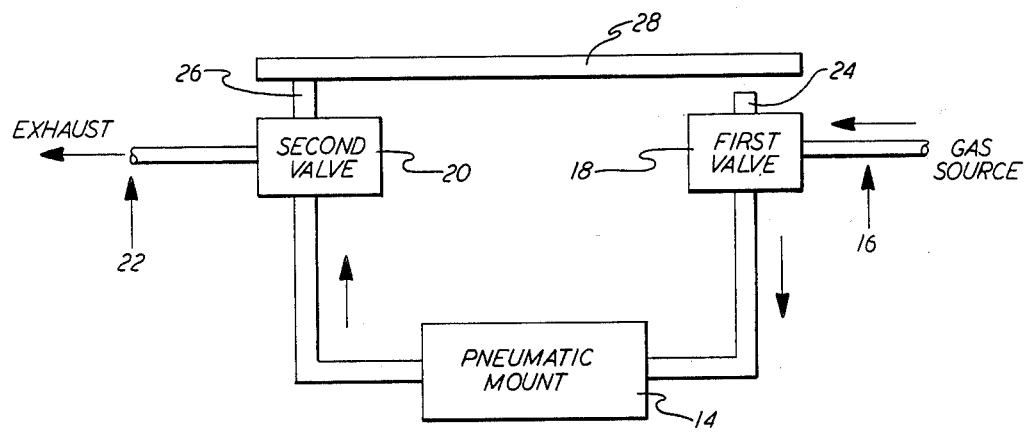
FIG. 1 is a schematic diagram of one embodiment of the invention.

It will be appreciated that each of said pneumatic spring mounts 14 has a preselected optimum linear range of operation in order to provide the optimum vibration and shock isolation of the optical bench. In operation, the optical bench carries delicate and sensitive analytical apparatus, which requires a substantially vibration and shock free environment for good performance. To maintain each pneumatic spring mount 14 in its optimum position, special valving and valve actuating mechanisms are employed. Referring to FIG. 1, gas is supplied under pressure from a gas source, as indicated at 16. The means for individually controlling the inflation and deflation of each of said pneumatic mounts 14 to maintain actual operation of each of said mounts within its preselected optimum linear operating range includes a first valve 18 for controlling the inflation of the pneumatic mount. That is, the first valve 18 controls the flow of gas from the source 16 to the pneumatic mount 14. A second valve 20 controls the deflation of the pneumatic mount 14. That is, the second valve controls the flow of gas from the pneumatic mount to a low pressure exhaust system or just to ambient, as indicated at 22, FIG. 1.

Still referring to FIG. 1, each of the valves has an actuating button 24, 26 respectively. The buttons are at different elevations for purposes which will be explained more fully hereinafter. A valve actuating bar 28 is engageable with the buttons so that vertical linear movement of the bar in one direction sequentially closes one valve and opens the other valve and vertical linear movement of the bar in the opposite direction sequentially closes said other valve and opens said first valve.

Figure 2:
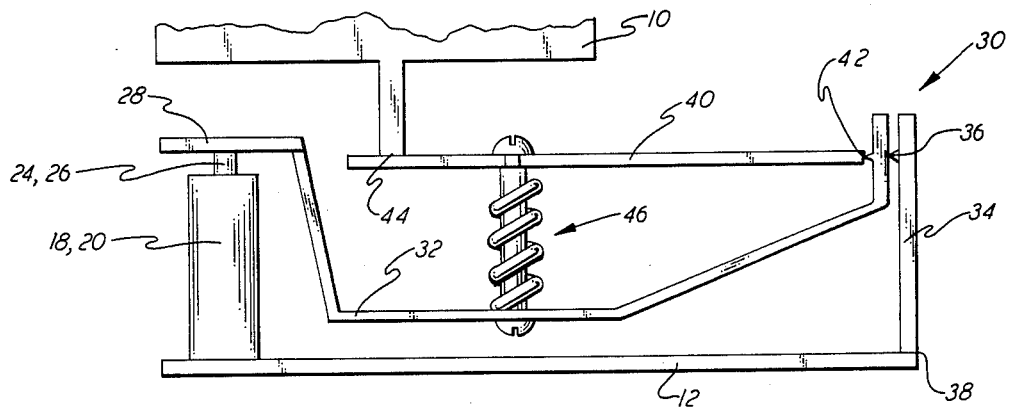
FIG. 2 is a side elevation depicting the valves and actuating means therefor.

FIG. 2 shows the valve actuating means, as indicated at 30, which includes trigger means for vertically linearly moving the valve actuating bar 28 responsive to movement of the optical bench 10 with respect to the base member 12. The actuating bar 28 is fixidly mounted on an actuating bar lever 32, which in turn, is pivotally mounted on a valve actuating mechanism bracket 34, as at 36. The bracket 34 is fixedly mounted on the base member 12 as at 38. The trigger means are in the form of a trigger finger 40 having one end thereof pivotally mounted on the actuating bar lever 32 as at 42. The other end of the trigger finger 40 frictionally engages the bottom of the optical bench 10, as at 44.

In operation, when there is no pressurized air from the gas source 16, the actuator bar 28 will be in its lowermost position and will engage both buttons 24 and 26. The first valve 18 will be open and the second valve 20 will be closed. Now, when air is supplied from the source 16, it will flow through the first valve 18 and start to fill the pneumatic mount 14 and thereby raise the optical bench 10. When the pneumatic mount reaches its optimum lowest elevation, the bar 28 will have elevated to the position as illustrated in FIG. 1, e.g., disengaged with button 24, but engaged with button 26. At this point in time, both valves will be closed and the system will remain in this normal operating position until disturbed. At this point the linear position of the mount is at its optimum vibration and shock isolation position. In the event that the optical bench should move upwardly a further distance, which could occur for such reasons as the removal of a piece of apparatus therefrom, the actuator bar 28 moves upwardly and disengages both buttons 24 and 26. The first valve 18 remains closed and the second valve 20 opens, thereby deflating the pneumatic mount 14. Deflation of the mount lowers the optical bench 10 and the actuator bar 28 until it again engages the button 26 of the second valve to thereby close the second valve, and the system returns to its normal operating position. In the event that the optical bench should move downwardly a further distance, which could occur when an additional piece of equipment is placed thereon, the actuator bar 28 moves downwardly and engages both buttons 24 and 26. The second valve remains closed and the first valve opens to thereby inflate the pneumatic mount 14. Inflation of the mount raises the optical bench 10 as well as the actuator bar 28 until it again disengages button 24 of the first valve 18 to thereby close the first valve, whereby the system returns to its normal operating position.

Referring to FIG. 2, spring stop means indicated at 46 are interposed between the actuating bar lever 32 and the trigger finger 40 as an overtravel protection. In the event that the air supply is turned off and the optical bench 10 begins to sink because the air for some reason is leaking out of the pneumatic mount 14, the optical bench 10 will engage the trigger finger 40, which will move downwardly carrying the actuating bar 28 until the buttons 24 and 26 prevent further downward movement of the actuating bar. To prevent bending and adverse destructive effects upon the systems components, the optical bench 10 and the trigger finger 40 can move down an additional distance while the actuator bar 28 remains stationary by means of the compression of the spring 46. This additional linear movement may be of the order of about one inch or so, for example.

It will be appreciated that the elements described above are constructed and arranged so that each of the pneumatic mounts 14 will remain in its preselected optimum linear range. As an example, in one installation, the operating range is of the order of about $\frac{1}{4}$ inch or about $\frac{1}{8}$ inch ± from the nominal operating position. That is, the pneumatic mount would have an optimum operating range of about $\frac{1}{2}$ inch or about $\frac{1}{4}$ inch ± from its normal operating position prior to installation in the system, but with the manufacturing and assembly tolerances of the individual components in the assembly, this reduces to the aforesaid range of about $\frac{1}{4}$ inch. As a result, additional specific adjusting means are not required.

As indicated hereinbefore, the pneumatic mounts and the valve actuating mechanism therefor are intended to maintain the actual operation of each of the mounts within its preselected optimum linear range for optimization of their vibration and shock isolation features. For purposes of leveling the apparatus, four adjustable feet 48, FIG. 3, are provided. Each of these feet include screw means for individual adjustment, whereby the optical bench can be leveled, as desired.

Although a certain particular embodiment of the invention is herein disclosed for purposes of explanation, various modification thereof, after study of this specification, will be apparent to those skilled in the art to which the invention pertains, and reference should accordingly be had to the appended claims in determining the scope of the invention.

What is claimed is:

1. In a sensitive analytical instrument having an optical bench carried by a base member, vibration and shock isolation apparatus comprising:

three spaced penumatic spring mounts interposed between said optical bench and said base member to provide vibration and shock isolation between the optical bench and the base member, each of said mounts having a preselected optimum linear range of operation:

a source of pressurized gas; and means for individually controlling the inflation and deflation of each of said mounts with said pressurized gas to maintain actual operation of each of said mounts within its preselected optimum linear operating range, said controlling means comprising a first valve for controlling the flow of said gas to said mount for controlling the inflation of said mount;

a second valve for controlling the flow of said gas from said mount for controlling the deflation of said mount;

each of said valves having an actuating button;

a valve actuating bar engageable with said buttons so that linear movement of said bar in one direction sequentially closes one valve and opens the other valve and in the opposite direction sequentially closes said other valve and opens said one valve; and trigger means for linearly moving said valve actuating bar responsive to movement of said optical bench with respect to the base member, said valve actuating bar being fixedly mounted on an actuating bar lever, said actuating bar lever being pivotally mounted on a bracket, and said bracket being fixedly mounted on said base member;

said trigger means being in the form of a trigger finger, said trigger finger being mounted on said actuating bar lever for engagement with said optical bench.

2. Apparatus according to claim 1 further comprising spring stop means interposed between said trigger finger and said actuating bar lever to allow overtravel of said trigger finger when said pneumatic mounts are void of air.

3. Apparatus according to claim 2 wherein one end of said trigger finger is pivotally mouned on said actuating bar lever and the other end thereof is engageable with said optical bench, said spring stop means being a spring mounted between said actuating bar lever and said trigger finger toward the middle of said trigger finger.

4. In a sensitive analytical instrument having an optical bench carried by a base member, vibration and shock isolation apparatus comprising:

three spaced pneumatic spring mounts interposed between said optical bench and said base member to provide vibration and shock isolation between the optical bench and the base member, each of said mounts having a preselected optimum linear range of operation;

a source of pressurized gas; and means for automatically controlling the inflation and deflation of each of said mounts with said presurized gas responsive to displacement of said optical bench to maintain actual operation of each of said mounts within its preselected optimum linear operating range, said controlling means comprising a first valve for controlling the flow of said gas to said mount for controlling the inflation of said mount; a second valve for controlling the flow of said gas from said mount for controlling the deflation of said mount; each of said valves having an actuating button; a valve actuating bar engageable with said buttons so that linear movement of said bar in one direction sequentially closes one valve and opens the other valve and in the opposite direction sequentially closes said other valve and opens said one valve; and trigger means for linearly moving said valve actuating bar responsive to movement of said optical bench with respect to the base member.

5. Apparatus according to claim 4 wherein said range is of the order of about ¼ inch.

6. Apparatus according to claim 4 further comprising at least three leveling feet mounted on the bottom of said base member.

* * * * *